United States Statutory Invention Registration [19]

[11] Reg. Number: H329

Bahnck [43] Published: Sep. 1, 1987

[54] AERODYNAMIC HOUSING

[75] Inventor: Thomas Bahnck, Ottsville, Pa.

[73] Assignee: The United States of America as represented by the Secretary of the Navy, Washington, D.C.

[21] Appl. No.: 403,822

[22] Filed: Jul. 30, 1982

[51] Int. Cl.[4] ..... H04B 1/59; F42B 25/00

[52] U.S. Cl. ..... 367/3; 244/87; 244/91; 102/385

[58] Field of Search ..... 244/87, 123, 91, 3.1, 244/3.24, 3.3, 3.23; 102/399, 385, 382, 384, 388, 490; 441/33; 89/1.5 A; 367/4

[56] References Cited

U.S. PATENT DOCUMENTS

| | | | |
|---|---|---|---|
| 1,189,382 | 7/1916 | Peck | 102/385 |
| 2,441,388 | 5/1948 | Blackington et al. | 244/3.24 |
| 2,494,885 | 1/1950 | Lax et al. | 102/385 |
| 2,693,922 | 11/1954 | Ellison et al. | 244/123 |
| 3,416,756 | 12/1968 | Windecker | 244/123 |
| 3,434,425 | 3/1969 | Critcher | 244/3.23 |
| 3,532,300 | 10/1970 | Bucklisch et al. | 244/3.24 |
| 3,873,048 | 3/1975 | Platon | 244/3.1 |
| 4,186,370 | 1/1980 | Cupolo et al. | 441/33 |

*Primary Examiner*—Deborah L. Kyle

*Assistant Examiner*—Michael J. Carone

*Attorney, Agent, or Firm*—Robert F. Beers; Henry Hansen

[57] ABSTRACT

An aerodynamic housing is disclosed for stabilizing the free-fall descent of an article, particularly a sonobuoy, launched from an aircraft. The housing is cylindrically-configured and includes a tail section wherein a plurality of symmetrical channels are formed obliquely to the cylindrical surface of the housing about the circumference thereof, each channel having a leading edge in the shape of a truncated ellipse. A tailring mounted at the rear of the tail section partially covers the channels thereby forming contoured air ducts through which air flows during the free-fall to orient the housing vertically and stabilize the descent.

7 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AERODYNAMIC HOUSING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the aerodynamic stabilization of an air-dropped article and more particularly to an improved housing for stabilizing the free-fall descent of an ocean-deployed sonobuoy after being launched from an aircraft.

Sonobuoys have long been launched from aircraft and deployed to ocean environments for the purpose of underwater surveillance. In order to assure that the sonobuoys reach the water surface accurately and without damage, it has been common practice to employ parachutes or rotochutes to stabilize and control the air descent of these ocean-deployed sonobuoys.

Parachutes have been used successfully in the deployment of the sonobuoys from fixed-wing surveillance aircraft flying at moderate altitudes in the range of 10,000 feet. For high-altitude launches, however, parachute descent of the sonobuoys has been excessively slow, adversely delaying the initiation of monitoring by the buoys and prolonging their overall time required to detect and transmit signals in the water. These parachute deployments from high altitudes are also prone to wind-drift problems that jeopardize accurate placement of the sonobuoys. Furthermore, in launches at lower altitudes from helicopters, which have become an increasingly popular and effective aircraft for surveillance operations, such parachute-equipped sonobuoys present a serious hazard to flight safety due to the high risk of parachute entanglement with either the tail rotor or engine inlet at launch.

Rotochutes, on the other hand, have been safely used to deploy those sonobuoys launched from helicopters. However, the flight-stabilizing rotochutes, have spring-loaded blades that swing outwardly from the sonobuoy for rotation, have only been effective on light-weight buoys at lower altitudes and airspeeds due to the damaging effects of excessive aerodynamic forces on the blades and rotational bearings. These limitations, as well as a relatively high cost of manufacturing, have generally prohibited continued use of rotochutes in the ocean-deployment of air-dropped sonobuoys.

Recently developed sonobuoys have been designed for rapid deployment without any descent retardation equipment. In these cases, stabilization of a free-falling sonobuoy has been effected by means of aerodynamically-designed housings having external stabilizing appendages, such as tail fins. While such aerodynamic housings have been generally satisfactory in stabilizing the free-fall descent of the air-dropped sonobuoy, they have not been totally successful in maintaining vertical attitude and, as a result, have not eliminated the substantial risk of mechanical damage to the sonobuoy upon water entry.

SUMMARY OF THE INVENTION

Accordingly, it is a general purpose and object of the present invention to provide an improved external housing for accurately deploying an article, particularly a sonobuoy, from an aircraft to an ocean environment without hazard to the aircraft or damage to the sonobuoy.

A further object of the present invention is to provide an aerodynamic housing for an air-dropped sonobuoy that effectively stabilizes and controls the free-fall descent of the sonobuoy from various altitudes.

A still further object of the present invention is to provide a housing for a free-falling article that aerodynamically maintains the article in a substantially vertical attitude during the free-fall.

Still another object of the present invention is to provide an aerodynamic housing that is simple yet reliable in performance, relatively easy and inexpensive to construct, and readily adaptable to a variety of applications involving the stabilization of free-falling articles.

Briefly, these and other objects of the present invention are accomplished by an aerodynamic housing for stabilizing the free-fall descent of an article, particularly a sonobuoy, launched from an aircraft. The housing is cylindrically-configured and includes a tail section wherein a plurality of symmetrical channels are formed obliquely to the cylindrical surface of the housing about the circumference thereof, each channel having a leading edge in the shape of a truncated ellipse. A tailring mounted at the rear of the tail section partially covers the channels thereby forming contoured air ducts through which air flows during the free-fall to orient the housing vertically and stabilize the descent.

For a better understanding of these and other aspects of the present invention, reference may be made to the following detailed description taken in conjunction with the accompanying drawing in which like reference characters designate like items throughout the figures thereof.

DESCRIPTION OF THE PREFERRED EMBODIMENT

Figure 1:
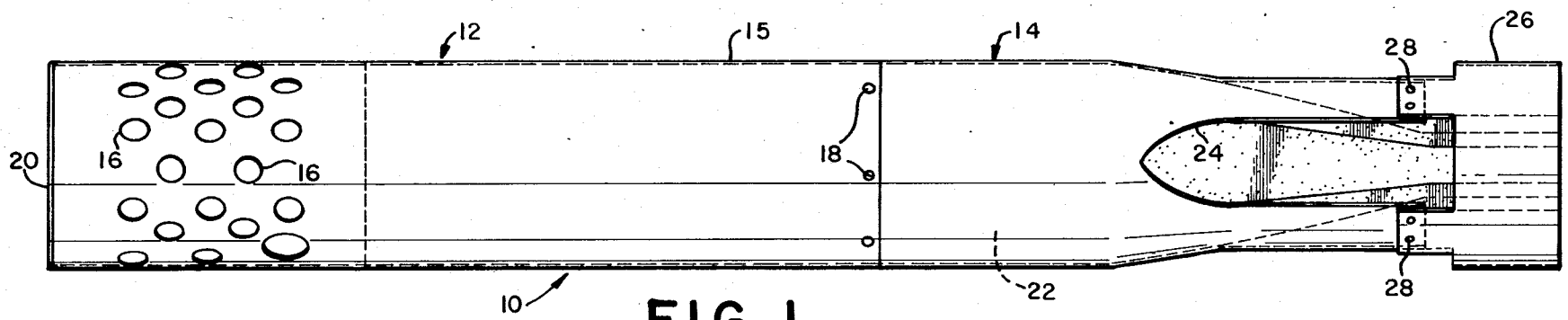
FIG. 1 is a longitudinal view of the aerodynamic housing according to the present invention.

Referring now to FIG. 1, there is shown an aerodynamic housing 10 for an air-dropped article, particularly an ocean-deployed sonobuoy. In accordance with the present invention, housing 10 is cylindrically-configured having a circumferential outer wall 15 of a strong, lightweight metallic material, such as aluminum, the wall extending longitudinally between and forming the exterior of a forward section 12 and separate tail section 14 adjacently connected thereto. Forward section 12 is a tubular compartment for containing conventional sonobuoy electronics (not shown) and may be fabricated having a pattern of holes 16 radially formed in the outer wall 15 near the front end of the forward section to facilitate sound passage to the sonobuoy transducer. A plurality of smaller holes 18 are similarly formed at the opposite end of the forward section 12 adjacent to tail section 14 so that air entrapped within the forward section during air descent of the housing 10 may be vented upon water entry thereby improving its sink rate. A circular plate member 20 having substantially the same diameter as the forward section 12 is adapted to be mounted to the front end of the forward section for the purpose of protectively securing the sonobuoy electronics within housing 10.

Figure 2:
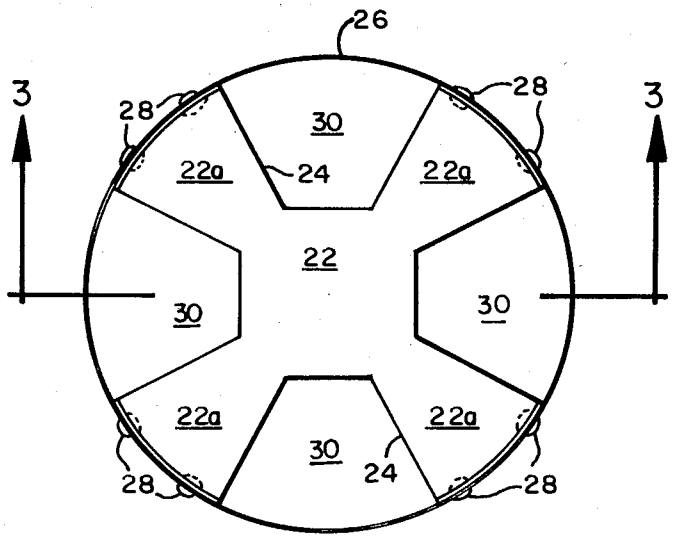
FIG. 2 is an end view of the aerodynamic housing shown in FIG. 1.
Figure 3:
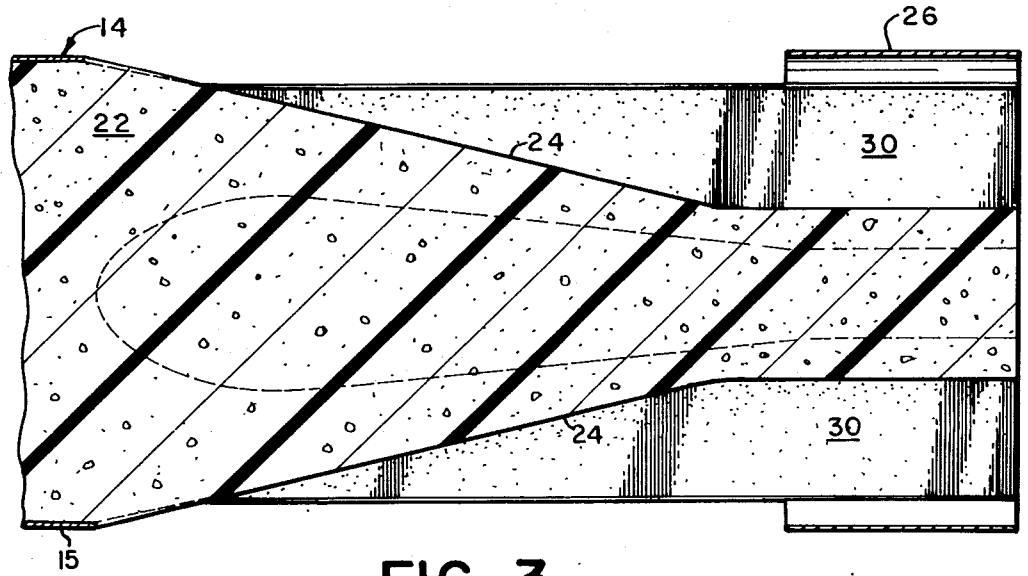
FIG. 3 is a sectional view of the housing taken along the line 3—3 in FIG. 2.

Referring now to FIGS. 2 and 3 in conjunction with FIG. 1, tail section 14 is further composed of a tail body 22, formed within the outer wall 15 and aerodynamically-shaped to stabilize the free-fall descent of housing 10. Tail body 22 is a solid member, preferably fabricated of a rigid, lightweight foam material, such as urethane, to provide greater buoyancy to the housing 10 in the water. Typically fabricated using convention molding or encapsulation techniques, tail body 22 is provided with a plurality of symmetrical channels 24 longitudinally formed along the rearward portion of the tail body. The forward portion of each channel 24 is formed obliquely through the circumferential outer wall 15, as better shown in FIG. 3, thereby providing each channel with a leading edge in the shape of a truncated ellipse. Near the aft end of tail body 22, the bottom of each channel 24 assumes an axial direction so that at the aft end, as better viewed in FIG. 2, the channels have substantially parallel bottom surfaces and radial sides that form fin-like members 22*a* between successive channels. It should be noted that the channels 24 and accordingly, the fin-like members 22*a*, are radially equidistant from each other, and that the number of each, four of which are shown centered 90° apart in the preferred embodiment, may vary provided radial symmetry is maintained.

A tail ring 26 is connected to the outer wall 15 around the aft end of tail body 22 with conventional fastening means, such as rivets 28, being used to secure the tail ring to the outer wall. Fabricated of the same strong, lightweight metallic material, the tail ring 26 is a cylindrical section of outer wall 15 and is adapted to cover a portion of the channels 24 near the aft end of tail body 22 thereby forming recessed air ducts 30 within the covered portion of each respective channel. During free-fall descent of housing 10, air is aerodynamically directed to flow through the recessed air ducts 30 via the leading edge of each respective channel 24 so that the housing is oriented vertically and stabilized in its descent.

Therefore, it is apparent that the disclosed invention provides an improved external housing for accurately deploying an article, particularly a sonobuoy, from an aircraft to an ocean environment without hazard to the aircraft or damage to the article. Furthermore, the disclosed sonobuoy housing effectively stabilizes and controls the free-fall descent of the sonobuoy from various altitudes, aerodynamically maintaining the sonobuoy in a substantially vertical attitude during the free-fall. In addition, the disclosed aerodynamic housing is simple yet reliable in performance, relatively easy and inexpensive to construct, and readily adaptable to a variety of applications requiring the stabilization of free-falling articles.

Obviously, other embodiments and modifications of the present invention will readily come to those of ordinary skill in the art having the benefit of the teachings presented in the foregoing description and drawings. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. An aerodynamic housing for a free-falling article, comprising:

a cylindrical member adapted to contain the article at the forward end thereof and having a plurality of longitudinal channels located along the rearward end, said channels being radially equidistant and formed obliquely to the outer wall of said member to provide each channel with a leading edge in the shape of a truncated ellipse; and a ring member mounted about the rearward end of said cylindrical member, said ring member being a continuous section of the outer wall of said cylindrical member to cover said channels aft of the leading edges thereof thereby forming recessed air ducts extending to the rearward end of said cylindrical member.

2. An aerodynamic housing according to claim 1, wherein:

said channels assume an axial direction near the rearward end of said cylindrical member to provide substantially parallel bottom surfaces and radial sides to each channel.

3. An aerodynamic housing according to claim 1, wherein said cylindrical member comprises:

an interior body fabricated of a rigid, lightweight foam material and formed to provide said channels; and an outer cylinder fabricated of a lightweight metallic material and adapted to fit and attach about said interior body.

4. An aerodynamic housing according to claim 3, wherein:

said foam material is urethane; and said metallic material is aluminum.

5. A sonobuoy housing, comprising:

a cylindrical forward compartment for containing the sonobuoy;

a cylindrical tail member connected to said compartment and formed having a plurality of longitudinal channels located along the rearward end of said tail member, said channels being radially equidistant and formed obliquely to the outer wall of said tail member to provide each channel with a leading edge in the shape of a truncated ellipse; and a ring member mounted about the rearward end of said tail member, said ring member being a continuous section of the outer wall of said cylindrical tail member to cover said channels aft of the leading edges thereof thereby forming recessed air ducts extending to the rearward end of said cylindrical tail member.

6. A sonobuoy housing according to claim 5, wherein:

said channels assume an axial direction near the rearward end of said cylindrical tail member to provide substantially parallel bottom surfaces and radial sides to each channel.

7. A sonobuoy housing according to claim 6, wherein said cylindrical tail member comprises:

an interior body fabricated of a rigid, lightweight foam material and formed to provide said channels; and an outer cylinder fabricated of a lightweight metallic material and adapted to fit and attach about said interior body.

* * * * *